United States Patent

Gottschald et al.

[11] Patent Number: 6,110,029
[45] Date of Patent: Aug. 29, 2000

[54] TEMPLATE FOR THE LENS OF A PAIR OF GLASSES

[75] Inventors: Lutz Gottschald, Meerbusch; Peter Koevari, Pullach; Jakob Wandinger, Waldkraiburg, all of Germany

[73] Assignees: Wernicke & Co. GmbH, Duesseldorf; Optische Werke G. Rodenstock, Munich, both of Germany

[21] Appl. No.: 09/341,469

[22] PCT Filed: Nov. 11, 1998

[86] PCT No.: PCT/DE98/03311

§ 371 Date: Sep. 10, 1999

§ 102(e) Date: Sep. 10, 1999

[87] PCT Pub. No.: WO99/24863

PCT Pub. Date: May 20, 1999

[30] Foreign Application Priority Data

Nov. 11, 1997 [DE] Germany .................... 197 49 631

[51] Int. Cl.[7] ........................................ B24B 41/06
[52] U.S. Cl. .................... 451/390; 451/281; 451/43
[58] Field of Search .................... 451/384, 42, 390, 451/460, 389, 364, 255, 256, 43, 44, 281, 237

[56] References Cited

U.S. PATENT DOCUMENTS

| 4,382,351 | 5/1983 | Sorrells | 451/384 |
| 5,649,856 | 7/1997 | Cook | 451/384 |

Primary Examiner—Derris H. Banks
Attorney, Agent, or Firm—Evenson, McKeown, Edwards & Lenahan, P.L.L.C.

[57] ABSTRACT

A template (1) intended for the lens of a pair of glasses (4), in which the template includes holes (14) for determining a drilling position for applying marks. The template (1) can be connected to a blocking member (10, 11) provided on the lens of the glasses (4) so that the template cannot be displaced and remains rotationally fixed relative to the blocking member (10, 11). The hole or the mark thus remains in a fixed position relative to the glasses lens.

13 Claims, 2 Drawing Sheets

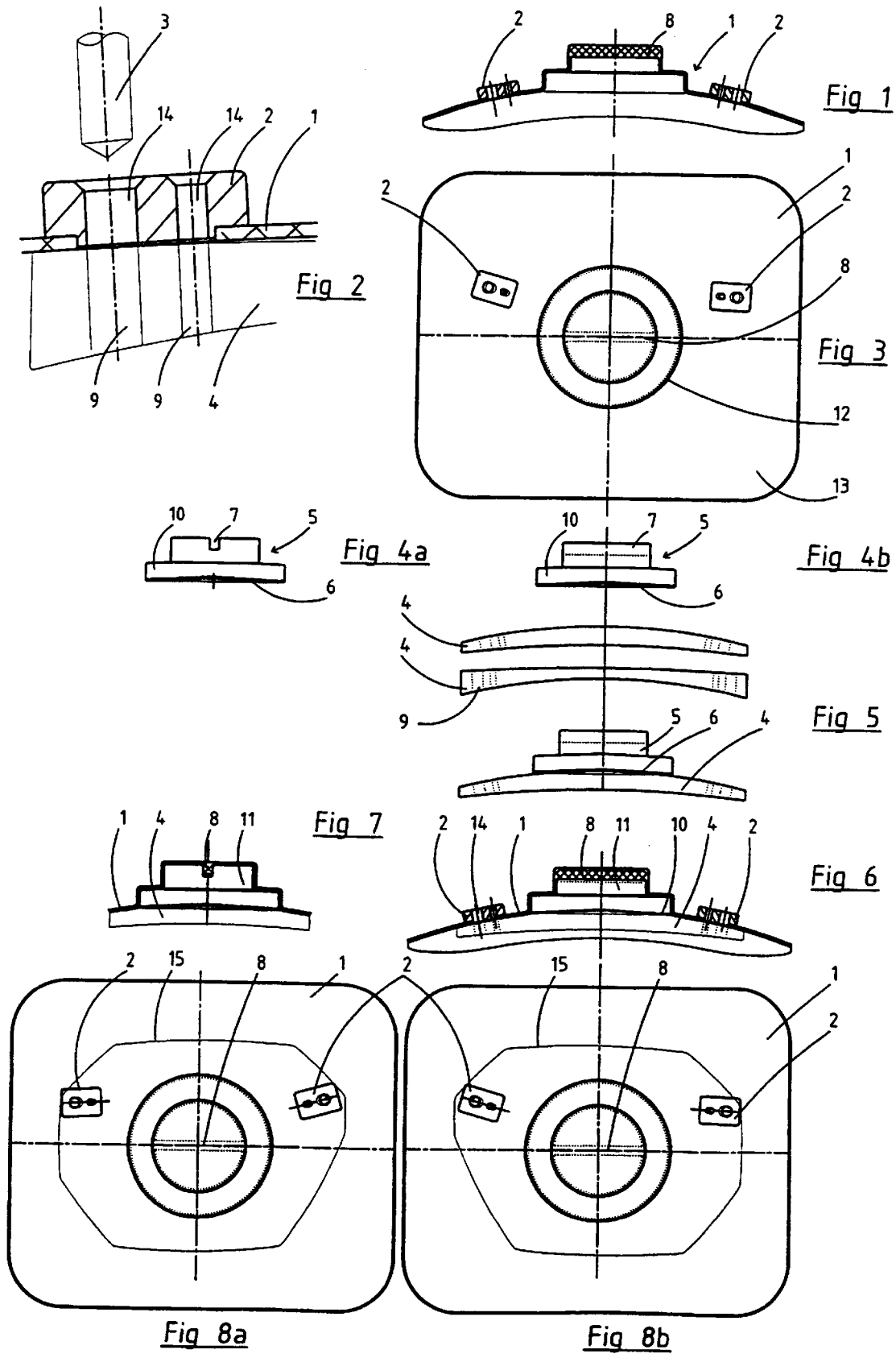

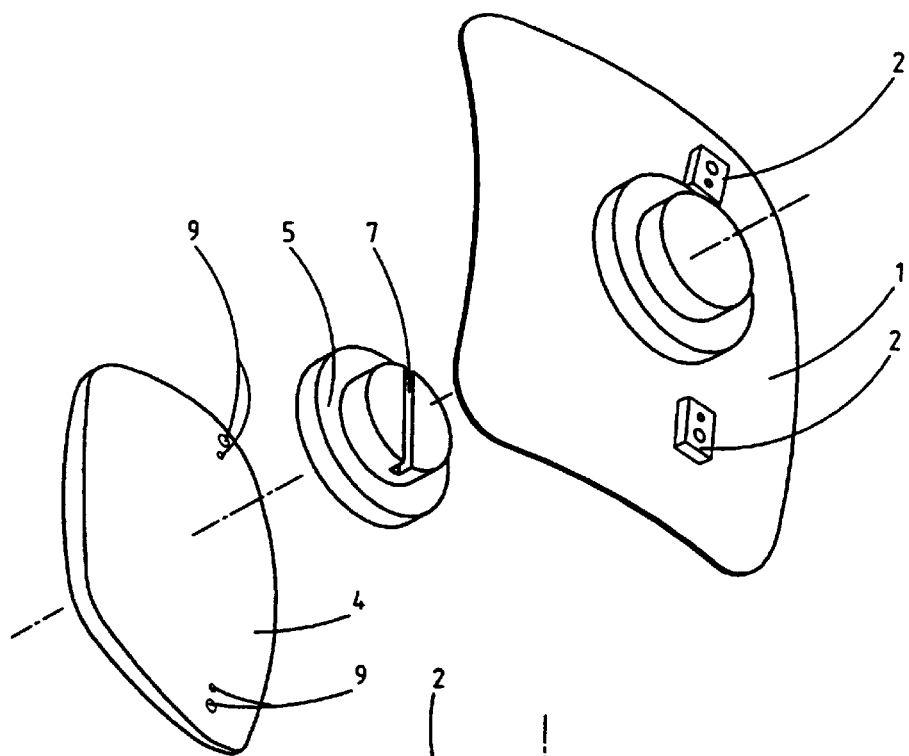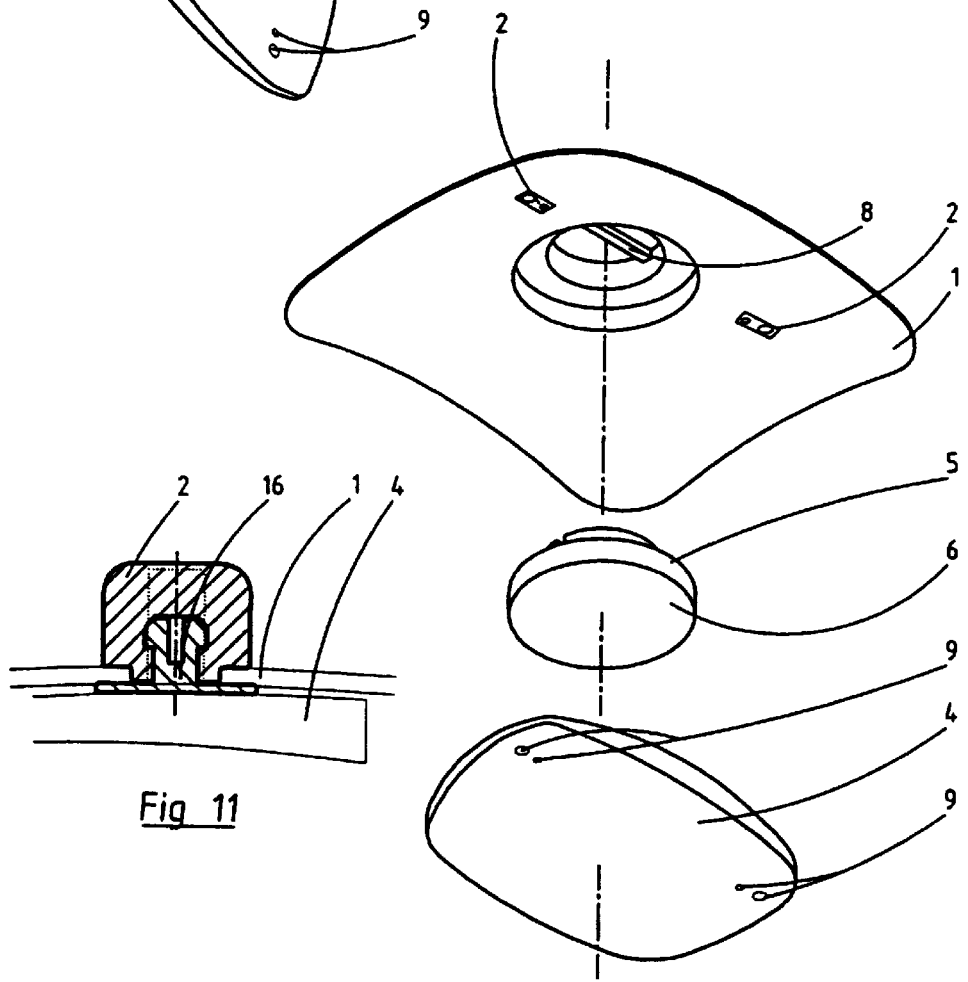

TEMPLATE FOR THE LENS OF A PAIR OF GLASSES

BACKGROUND OF THE INVENTION

The invention relates to a template for an eyeglass lens with at least one hole or one marking.

Templates for eyeglass lenses serve, among other things, to determine the locations at which holes are to be drilled through the eyeglass lens or to determine the position at which a fitting or mounting is to be affixed, for example by gluing. Using a template, markings can also be applied to an eyeglass lens. Templates are also particularly necessary when ear pieces (cheek pieces) or nose bridges for frameless eyeglasses must be affixed to the eyeglass lenses.

Various templates are already known: The subject of published German patent application 44 38 634 is a template with which the location can be determined at which a bore hole is to be drilled in an eyeglass lens. This template can be a transparent sheet which can be laid on the eyeglass lens on top of an adhesive surface. The adhesive effect is designed such that on the one hand, a slipping of the sheet on the glass is not possible during the operative procedures; on the other hand, the sheet can be removed without difficulty from the glass after being worked on.

This type of template is difficult to deal with since laying a flat adhesive sheet onto a curved eyeglass lens surface generally isn't successful on the first try. Since the sheet sticks, it cannot be slid or turned with respect to the glass. Rather, it must be completely removed from the glass. Moreover, a sheet is not very suitable as a bore template. On the one hand, it is difficult to drill bore holes which are to be an exact distance from one another. On the other hand, it is difficult to drill a hole in the glass such that the bore hole axis is at a desired angle to the surrounding glass surface.

From the German utility model 93 04 045 it is known to also use as a hole gauge an eyeglass lens former which is used to grind eyeglass lenses. For this purpose, holes are located in the eyeglass lens former. For drilling, an eyeglass lens former is placed on the eyeglass lens. The holes in the eyeglass lens former are used as a guide for a drill. The eyeglass lens former is a rigid, flat disc. In order to be able to drill perfectly, it is necessary to use a plate with pins for receiving an eyeglass lens former and also with additional eccentric stops. In this way the eyeglass lens and eyeglass lens former can be adjusted to one another, however the use of this template is very expensive. The lens and the eyeglass lens former are attached to each other with an adhesive pad.

Using rigid, flat templates with openings for a drill is also known. The templates are placed tangentially in the central region of an eyeglass lens. If bore holes in the outer region of the lens are made into it, the axes of the bore holes form differing angles with respect to the surface of the eyeglass lens, which angles depend on the curvature of the surface of the eyeglass lens. This can be disadvantageous for affixing fittings.

SUMMARY OF THE INVENTION

It is the object of the invention to provide a template of the aforedescribed type which is easy to use and yet still enables the quick and economical application of markings on eyeglass lenses or the determination of locations for affixing fittings and mountings or for bore holes.

This object is achieved in accordance with the invention in that the template can be attached so that it cannot slip or turn to a blocker placed on the eyeglass lens such that the position of the hole or the marking is fixed in relation to the eyeglass lens.

The invention is based on the discovery that a blocker is outstandingly suitable to work in conjunction with a suitable template and to achieve the object of the invention:

One of the tasks of an optician is to fit the eyeglass lens blank, usually delivered by the producer with a circular circumference, to the shape pre-determined by an eyeglass frame, or, in the case of frameless glasses, to the desired shape. The shaping can take place in an automatic machine for forming lens edges. Serving to attach the eyeglass lens blank on a rotating shaft of the machine is a so-called blocker (also called receiving block) and an opposing mount bearing along the same axis, both of which hold the blank in its central region. The blockers can be designed as suction blockers or adhesive blockers. A blocker's purpose and method of functioning are explained in DE 43 00 673 A1, for example.

The content of this published German patent application is expressly incorporated in the present patent application.

In accordance with the invention, the provided template is attached to a blocker which is set on the eyeglass lens such that the template cannot be turned with respect to the blocker. Since the blocker itself is affixed to the eyeglass lens so that it can neither slip nor turn (see DE 43 00 673 A1, column 1, lines 13 and 14), the template likewise cannot be turned with respect to the eyeglass lens.

Various ways of attaching the blocker to the template are possible. In particular, the attachment can be designed in such a way that it is easy to release. As soon as the template is attached to the blocker, the template's marking or hole is located over the place on the eyeglass lens which is to be marked or at which a hole is to be drilled or a fitting positioned. This type of template is easy to employ. It can be quickly placed on the eyeglass lens and removed. Because of these features and the possibility of being able to reuse the template many times, the proposed template is very economical.

Since in any case the edge of the blank provided by the eyeglass lens producer must be shaped to the prescribed or desired form of an eyeglass lens, it is also necessary to apply a blocker to the eyeglass lens blank. For the use of the proposed template, this means that application of a blocker is not an additional operational process.

It is not necessary to first shape the edge of the eyeglass lens blank and subsequently make the markings or determine the location of a bore hole or a fitting which is to be attached. Rather, it is possible to complete these activities before shaping the edge.

Naturally, the term "bore hole" also includes openings in the eyeglass lens other than just those which are rotationally symmetric openings. In accordance with the invention, this term also includes slit-shaped openings or, for example, milled slots or abrasions in the region of the edge of an eyeglass lens with a shaped edge.

The proposed template is then particularly advantageous to use if two holes which must be a fixed distance from each other are to be bored in an eyeglass lens. This is required, for example, in order to affix an ear piece or bridge in the lenses of a frameless pair of glasses so that it won't turn.

Naturally, the proposed template can also be used without a blocker that is attached to the eyeglass lens. This is necessary when, for instance, a customer desires an individual disc shape. In this case, the lens can first be blocked, and the outer shape of the lenses can be individually ground. Then, the blocker is removed, the template is put in place with the aid of markings, and the lens is held against the template in the region where drilling occurs. Now the drilling of the lens and the subsequent assembly can occur.

A preferred embodiment of the invention is provided when, in a partial region, the bore template's shape is correlated to the shape of the blocker for an eyeglass lens. In this embodiment, the template has a shape in a partial region which makes it surround the blocker such that it is constantly touching. Since nearly all blocker heads are the same shape, it is not necessary to stock a large number of templates which fit various blocker head shapes. A typical blocker head shape is illustrated, for example, in FIG. 2 of the German utility model 92 00 513.

In another advantageous embodiment of the invention, at least the region of the template adjacent to the partial region is made of material which can be elastically deformed. In this way, the bore template can easily be adapted to the different shapes of the eyeglass lens surfaces. Thus, the template can be employed with spherical and aspherical eyeglass lenses, with convex or concave lenses or with lenses having lens surfaces with different radii of curvature. By pressing lightly on the central region or the edge region of the template, it can be adapted to different surfaces.

A template in accordance with the invention is particularly easy and economical to produce when the whole template is an injection molded part.

In another advantageous embodiment, the template is designed as a bore template. There, a drill guide made of metal is fastened in the template. The metal drill guide has a round cylindrical opening into which a drill with an appropriate diameter can be inserted. Because of the drill guide, the location of the bore hole can be fixed exactly and the drilling can be completed without any complications.

The drill guide can be fixed in the template in very different ways. In one preferred embodiment, the drill guide is fixed in the template by gluing, pressing in, fitting in or with a clip fastener.

The longitudinal axis of the drill guide can advantageously form a defined, in particular a right, angle with the template surface surrounding it.

If the template is made of elastic material at least in its outer region, it can thus, as previously explained, be deformed such that it lies on the eyeglass lens surface. In this way it is possible to produce bore holes in which the axis of the bore hole forms the same angle with the eyeglass lens surface as the longitudinal axis of the drill guide with the template surface surrounding it.

In another preferred embodiment the template is spherical outside the region in which it can be attached to the blocker.

If the spherical template region has a radius smaller than radius of curvature of the surface of the eyeglass lens, then the template can be advantageously fitted on a given eyeglass lens surface by simply pressing on the area in which it is able to make contact with the blocker.

In further preferred embodiments the template is made of transparent material and/or has at least one marking, especially a marking having a form corresponding to the circumferential contour of the eyeglass lens.

In this embodiment, it can be determined in a particularly simple manner if the marking on the template corresponds to the circumferential contour of the eyeglass lens to be shaped.

BRIEF DESCRIPTION OF THE DRAWINGS

In the following, an illustrative embodiment will be explained with reference to drawings.

Shown are:

FIG. 1: A section through a template having drill guides in accordance with the invention.

FIG. 2: An enlargement of the part illustrated in the circle shown in broken lines in FIG. 1, of a template placed on an eyeglass lens.

FIG. 3: A view from above of the template according to FIG. 1.

FIGS. 4a and 4b: A front and a side view of a blocker.

FIG. 5: Both a convex and concave lens, as well as a blocker adhered to a convex lens.

FIG. 6: A template which is attached to a blocker which, in turn, is affixed to the eyeglass lens.

FIG. 7: A section which is perpendicular to the section shown in FIG. 6 taken through the region of the blocker.

FIGS. 8a and 8b: Top views of templates for a right and a left eyeglass lens.

FIGS. 9 and 10: Isometric views from above (FIG. 9) and below (FIG. 10) of a template, a blocker and an eyeglass lens.

FIG. 11: A drill guide which is fastened to the template by means of a clip fastening.

In the figures, corresponding parts are identified with the same reference numerals.

DETAILED DESCRIPTION OF PREFERRED EMBODIMENTS

The template 1 shown in the figures is an injection molded part. In a partial region 12 which is centrally located, the template 1 has a shape that is correlated to the shape of the blocker 5 for an eyeglass lens 4. A blocker 5 is shown in the FIGS. 4a and 4b. FIG. 4a shows that there is a groove 7 in the blocker head 11. An adhesive pad is adhered to the underside of the lower part 10 of the blocker 5. The blocker head 11 has the shape of a screw head.

The central partial region 12 of the template 1 is designed as a negative receiving part for the blocker head 11. In this receiving part, a ridge 8 aids insertion into the proper position.

Region 13 of the template 1, which surrounds the receiving part 12, is also made of elastically deformable material. In this region 13, two drill guides 2 of metal are fixed. In each guide 2 in this illustrative embodiment, there are two openings with a round cylindrical cross-sectional area. These serve to receive and guide a drill 3. The openings can have different diameters.

Before the shaping of the edge of an eyeglass lens 4, the blocker 5 is placed onto the eyeglass lens 4 in a centering device, in which the eyeglass lens blank 4 is aligned in accordance with the decentration values, the position of the axis and/or the position of a nearby part, and attached by gluing, for instance. The blocker 5, which is glued on the eyeglass lens blank 4, can now be inserted in precisely the correct position in the corresponding negative receiving part on the shaft of the automatic machine for shaping edges. In the same manner, the inventive template can be placed on the eyeglass lens blank 4 with the glued-on blocker 5. It is not important whether the shaping of the edge of the blank occurs first and then the drilling of the eyeglass lens or first the drilling of the blank and then the shaping of its edge.

As long as it is assured that the ridge 8 and the groove 7 are in engagement, the template 1 is attached to the blocker 5 so that it cannot turn or slip, due to its shape which is correlated to the blocker 5. The blocker 5, for its part, is attached to the eyeglass lens (blank) 4 so that it cannot turn or slip. In this way the position of the drill guides 2 and the bore axes is fixed precisely. It is now easily possible to drill the intended holes 9 in the eyeglass lens 4 by inserting an appropriate drill 3 into an opening 14 in the drill guide 2 and drilling the required hole.

The region 13 of the template 1 which surrounds the receiving part 12 can be flat. Due to its elastic properties, it is possible, using gentle pressure, to place the template either onto the receiving part 12 or onto the surrounding region 13 on the surface of the eyeglass lens.

In the illustrative embodiment, the region 13 surrounding the receiving part 12 is constructed in spherical form. If the spherical radius of the spherical region 13 of the template is smaller than the radius of curvature of the surface of the eyeglass lens 4, the template can be made to lie on the surface of the eyeglass lens by pressing the receiving part 12 onto the eyeglass lens.

The drill guides are fixed in the template 1 by gluing, pressing in, or fitting in, for example. The longitudinal axes of the openings 14 in the drill guide 2 form a defined angle with the surrounding surface, which in the illustrative embodiment is 90°. Of course, other angles can also be chosen.

The template 1, made of transparent material in the illustrative embodiment, has a marking 15 on it, which shows the outline of the circumferential shape of an eyeglass lens whose edge has been formed.

In FIG. 11, a variation of the drill guide 2 is shown.

The drill guide 2 is made of metal. From the underside of the template 1 (=the side facing the eyeglass lens), a small plate made of synthetic resin material is anchored in the drill guide 2 with a clip. In this variation, contact between the metal drill guide 2 and the eyeglass lens is avoided with certainty.

What is claimed is:

1. An eyeglass lens template with at least one hole or one marking, wherein the template can be attached so that the template cannot turn or slip relative to a blocker which is set on the eyeglass lens, such that the position of the hole or the marking of the template is fixed with respect to the eyeglass lens.

2. A template according to claim 1, wherein, in a partial region, the template has a shape which corresponds to a shape of the blocker for an eyeglass lens.

3. A template according to claim 2, wherein at least a region of the template adjacent to the partial region is made of elastically deformable material.

4. A template according to claim 1, wherein the entire template is an injection molded part.

5. A template according to claim 1, wherein a metal drill guide with at least one opening for receiving a drill is fixed in the template.

6. A template according to claim 5, wherein the drill guide is fixed in the template by gluing, pressing in, fitting in, or with a clip fastener.

7. A template according to claim 5, wherein the opening of the drill guide has a longitudinal axis which forms a defined angle with a surrounding template surface.

8. A template according to claim 7, wherein the longitudinal axis of the drill guide form a right angle with the surrounding surface of the template.

9. A template according to claim 1, wherein a portion of the template outside the region in which the template can be attached to the blocker, is spherical.

10. A template according to claim 9, wherein the spherical portion of the template has a radius of curvature which is smaller than the radius of curvature of the surface of the eyeglass lens.

11. A template according to claim 1, wherein the template is made of transparent material.

12. A template according to claim 1, wherein the template has at least one marking.

13. A template according to claim 12, wherein the template has a marking having a form corresponding to a circumferential contour of the eyeglass lens.

* * * * *